United States Patent
Pallardy et al.

(10) Patent No.: US 11,775,037 B2
(45) Date of Patent: Oct. 3, 2023

(54) METHOD OF RESETTING A MASTER DEVICE OF A SYSTEM ON CHIP AND CORRESPONDING SYSTEM ON CHIP

(71) Applicants: STMicroelectronics (Grenoble 2) SAS, Grenoble (FR); STMicroelectronics (Grand Ouest) SAS, Le Mans (FR)

(72) Inventors: Loic Pallardy, Rouillon (FR); Michael Soulie, Chirens (FR)

(73) Assignees: STMicroelectronics (Grenoble 2) SAS, Grenoble (FR); STMicroelectronics (Grand Ouest) SAS, Le Mans (FR)

( * ) Notice: Subject to any disclaimer, the term of this patent is extended or adjusted under 35 U.S.C. 154(b) by 0 days.

(21) Appl. No.: 17/540,041

(22) Filed: Dec. 1, 2021

(65) Prior Publication Data

US 2022/0179659 A1 Jun. 9, 2022

(30) Foreign Application Priority Data

Dec. 4, 2020 (FR) ...................................... 2012718

(51) Int. Cl.
*G06F 1/24* (2006.01)
*G06F 9/4401* (2018.01)
*G06F 13/40* (2006.01)
*G06F 11/14* (2006.01)
*G06F 15/78* (2006.01)

(52) U.S. Cl.
CPC ............. *G06F 1/24* (2013.01); *G06F 9/4401* (2013.01); *G06F 11/1441* (2013.01); *G06F 13/4068* (2013.01); *G06F 15/7807* (2013.01); *G06F 2213/40* (2013.01)

(58) Field of Classification Search
CPC ........ G06F 1/24; G06F 9/4401; G06F 9/4418; G06F 11/1441; G06F 13/4068; G06F 2213/40; G06F 9/466; G06F 13/20; G06F 15/7807
See application file for complete search history.

(56) References Cited

U.S. PATENT DOCUMENTS

| | | | | |
|---|---|---|---|---|
| 6,658,507 B1 * | 12/2003 | Chan | ................... | G06F 13/4081 710/301 |
| 10,318,466 B2 | 6/2019 | Krutsch et al. | | |
| 2003/0221140 A1 * | 11/2003 | Bakke | ................... | G06F 11/079 714/E11.026 |
| 2013/0138858 A1 * | 5/2013 | Adler | ................... | G06F 13/366 710/305 |
| 2013/0238916 A1 * | 9/2013 | Dohm | ...................... | G06F 1/32 713/320 |
| 2014/0281695 A1 * | 9/2014 | Kraipak | .............. | G06F 11/0766 714/10 |
| 2016/0062424 A1 * | 3/2016 | Thomas | ................... | G06F 1/24 713/1 |
| 2016/0239060 A1 * | 8/2016 | Koob | ................... | G06F 1/3237 |
| 2016/0357696 A1 * | 12/2016 | Klinglesmith | ...... | G06F 13/4022 |

(Continued)

*Primary Examiner* — Thomas J. Cleary
(74) *Attorney, Agent, or Firm* — Slater Matsil, LLP

(57) ABSTRACT

The method for resetting a master device, configured to initiate transactions on a bus of a system on a chip, includes monitoring a completed or not state of the transactions initiated by the master device. In the case of reception of a command to reset the master device, the method includes a transmission of an effective reset command to the master device when the transactions initiated by the master device are in the completed state.

22 Claims, 10 Drawing Sheets

(56) References Cited

U.S. PATENT DOCUMENTS

2017/0139721 A1* 5/2017 Feehrer .................. G06F 13/20
2019/0212794 A1 6/2019 Hu et al.
2019/0303777 A1* 10/2019 Desai .................. G06F 11/1402
2022/0100607 A1* 3/2022 Behl .................. G06F 11/0778

* cited by examiner

[Fig 1]
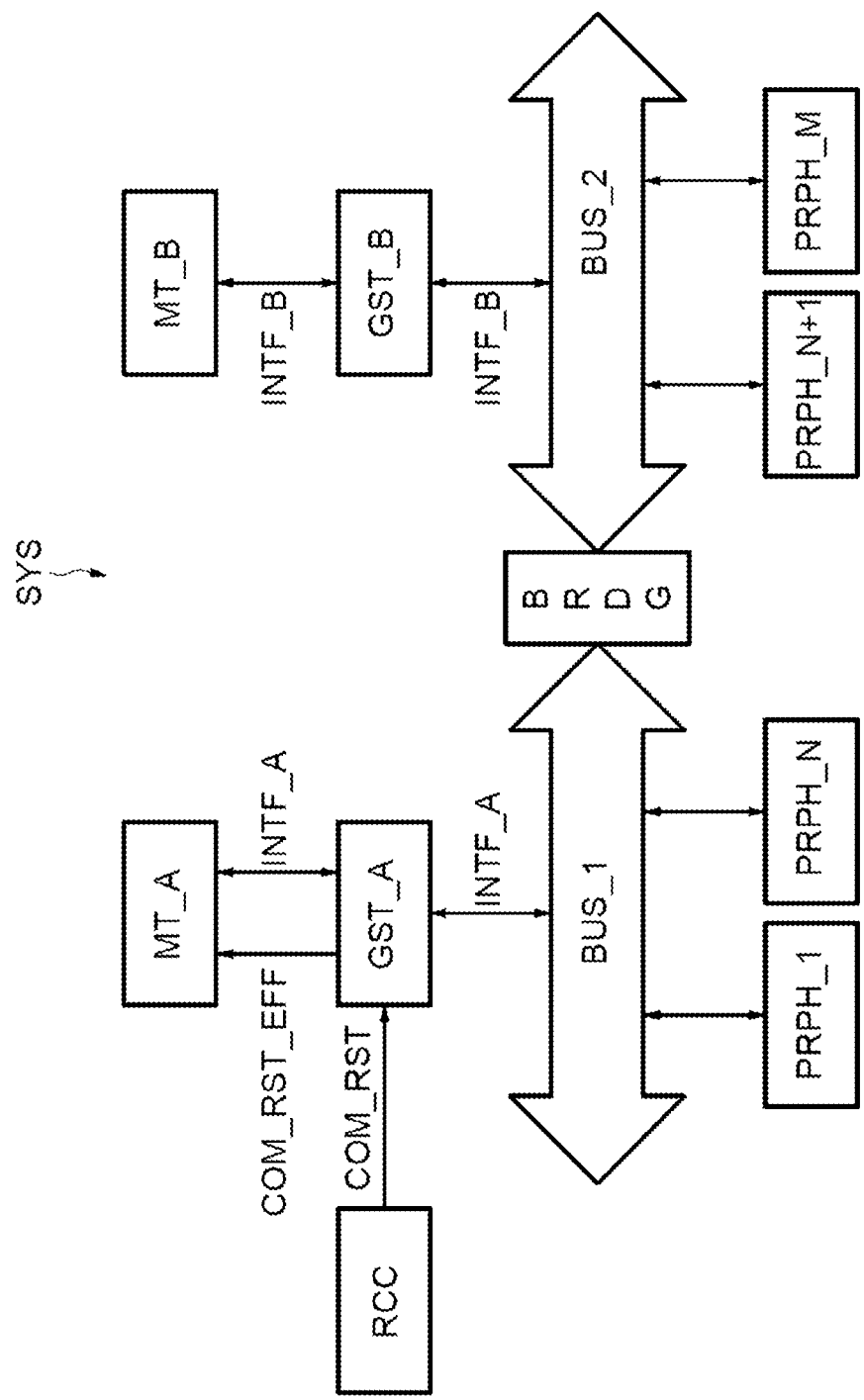

[Fig 2]
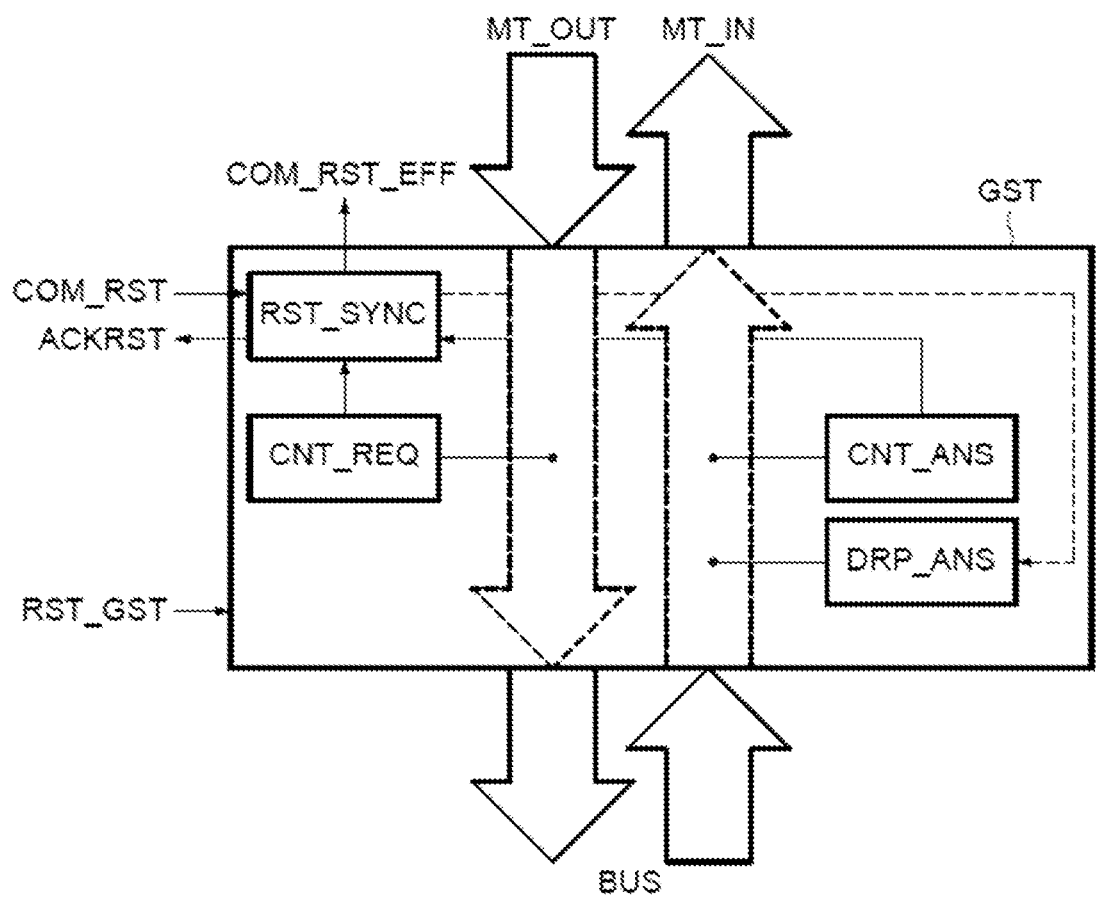

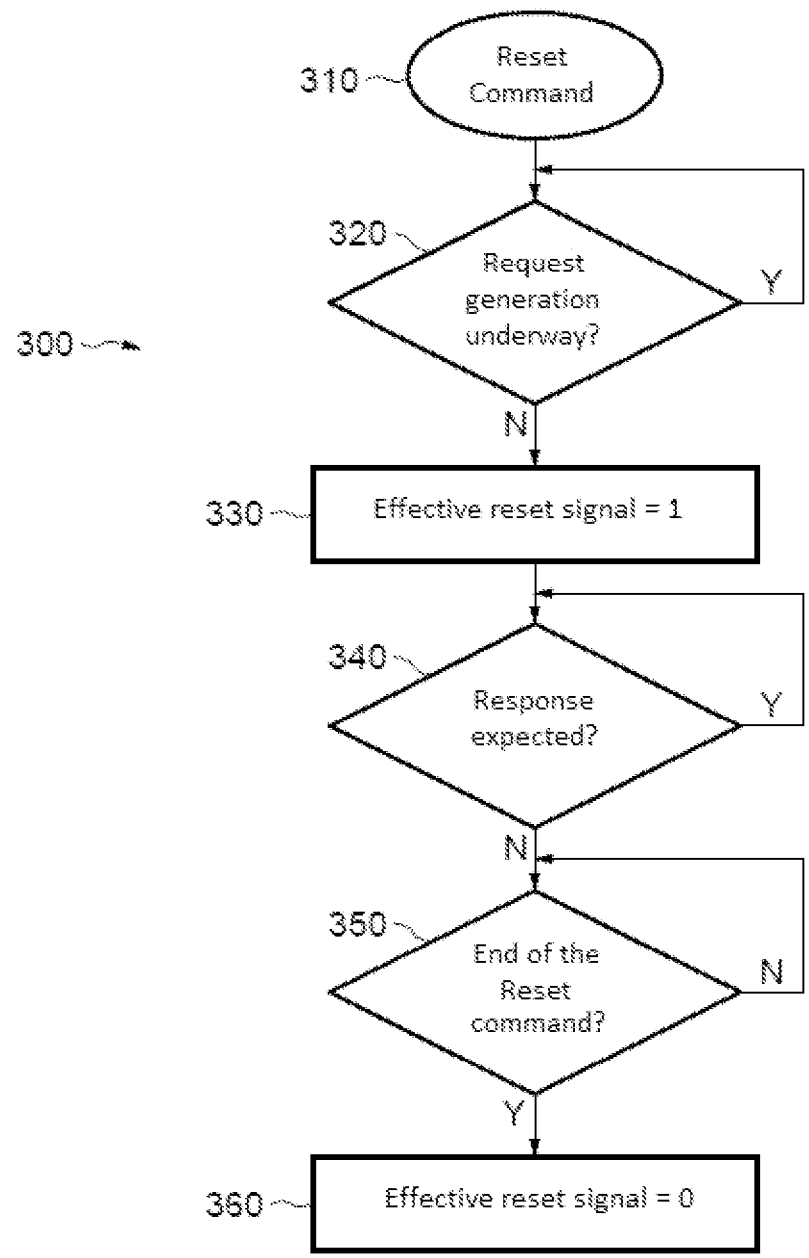
[Fig 3]

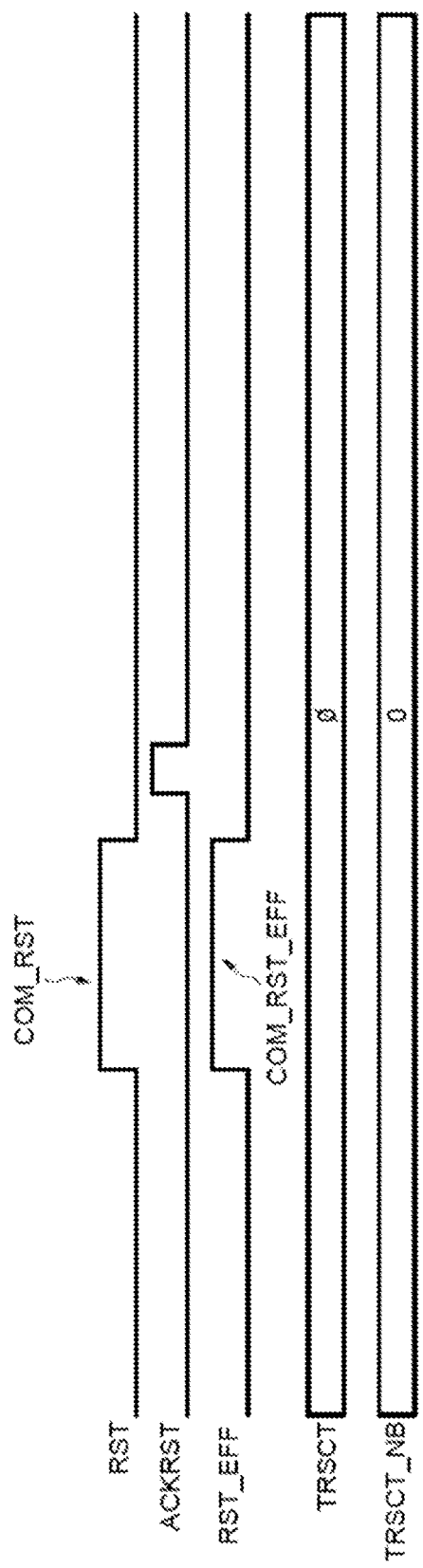
[Fig 4]

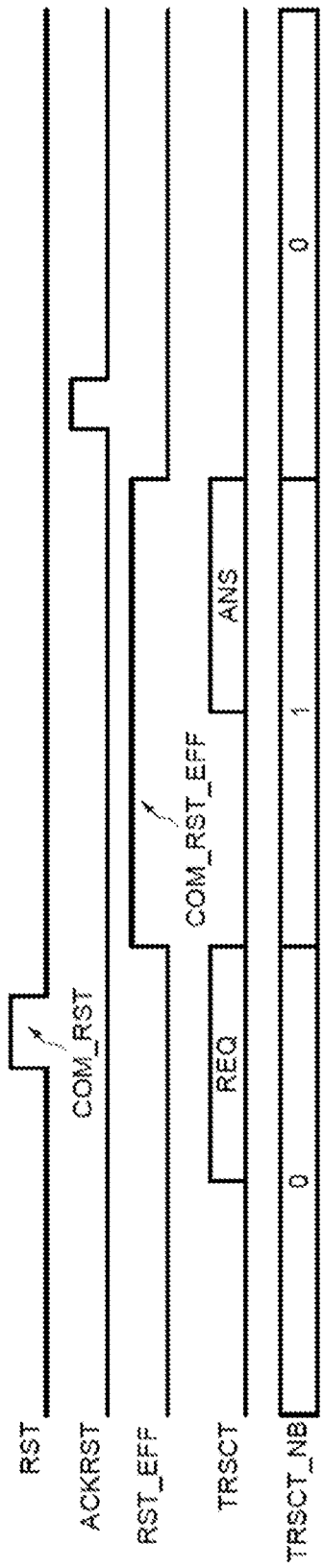

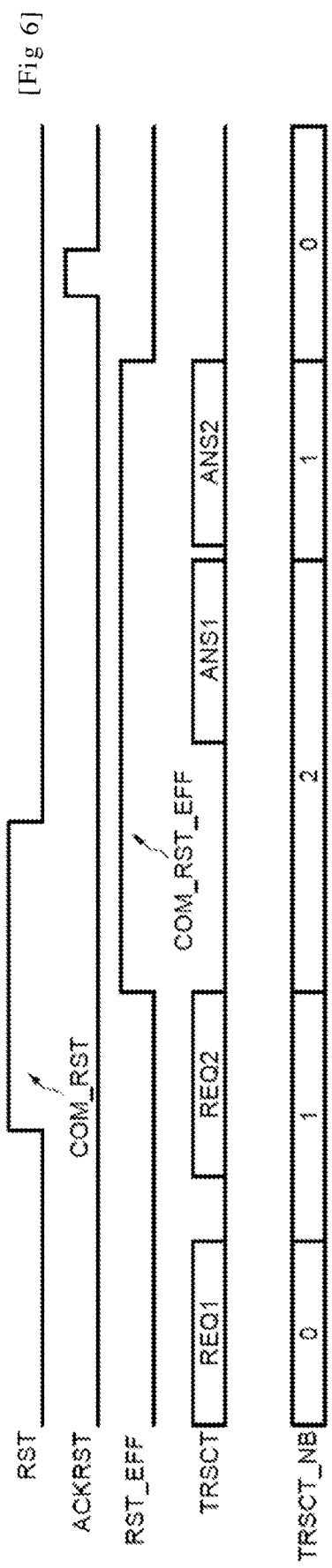

[Fig 7]
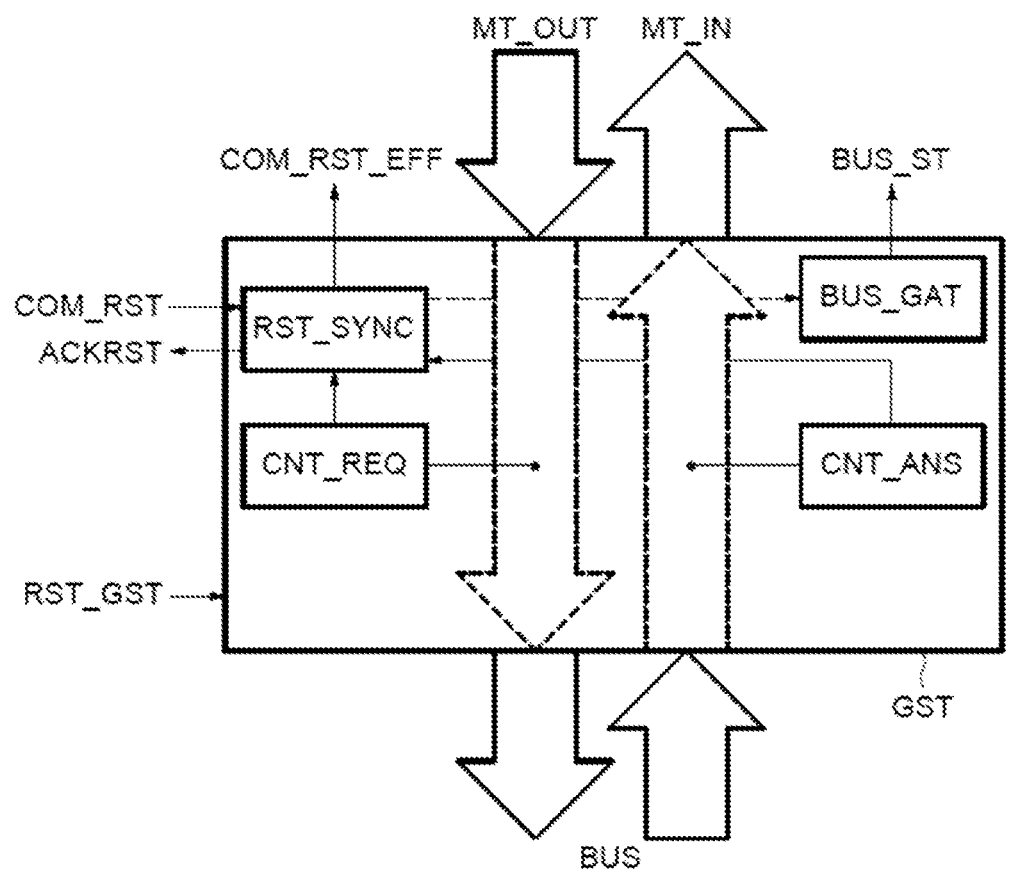

[Fig 8]
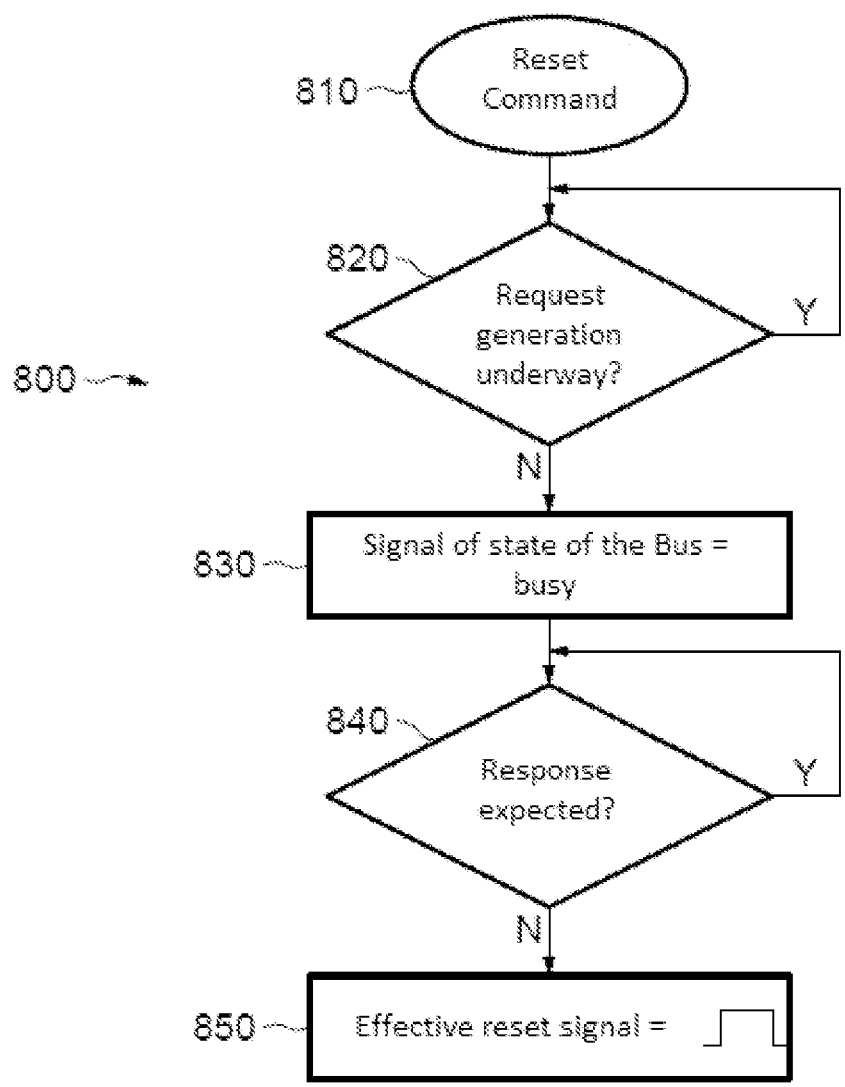

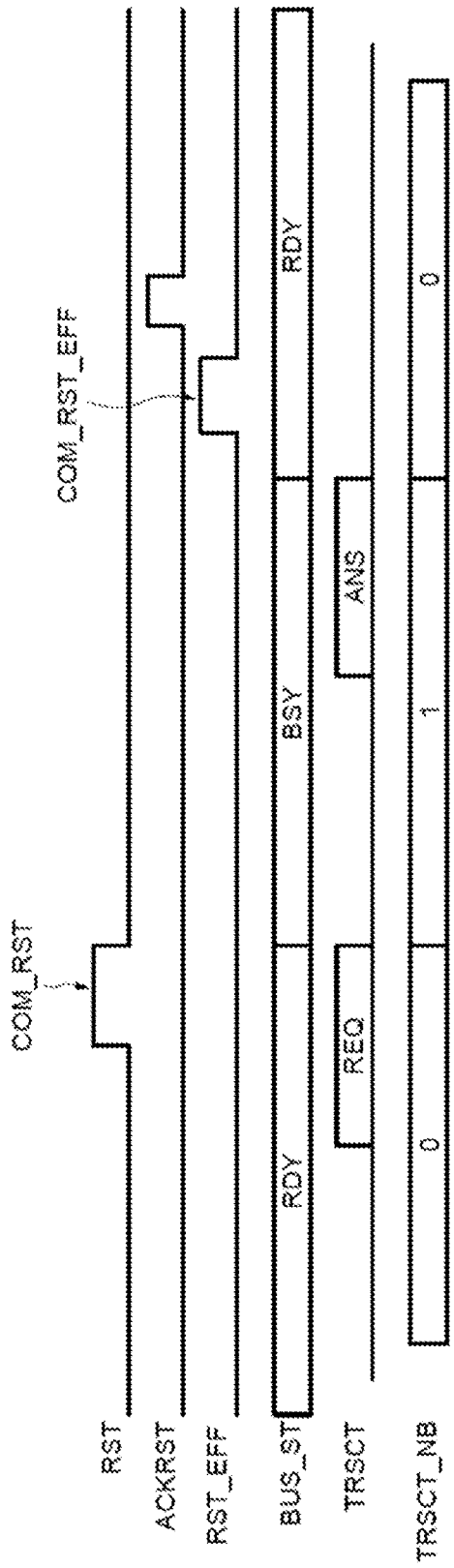

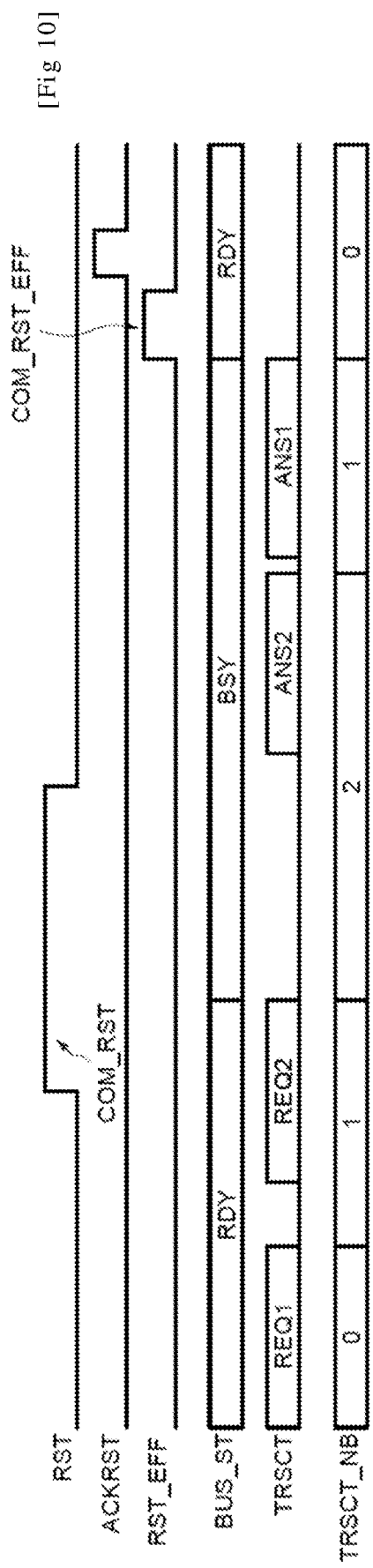

METHOD OF RESETTING A MASTER DEVICE OF A SYSTEM ON CHIP AND CORRESPONDING SYSTEM ON CHIP

CROSS-REFERENCE TO RELATED APPLICATIONS

This application claims priority to French Application No. FR 2012718 filed on Dec. 4, 2020, which application is hereby incorporated by reference herein in its entirety.

TECHNICAL FIELD

The present disclosure generally relates to systems on a chip and, in particular embodiments, to resetting of master devices capable of initiating transactions on a bus of a system on a chip.

BACKGROUND

Systems on a chip typically include one or more master devices capable of initiating transactions on one or more buses. A transaction is typically initiated by the emission of a request by a master and is completed by the reception of a response emitted by a slave device or by another master device that has a control interface operating in slave mode.

The outstanding transactions can be initiated consecutively, that is to say, that new requests can be emitted by the master before reception of the responses to the previous requests.

During the resetting of a master device, the system must consider the ongoing transactions on the bus, for example, if a reset of a master occurs while the master is emitting a transaction on the bus, the transaction can be incomplete, and the bus can stall, to the point of requiring a reset of the entire system. And, if a reset of a master occurs while the master is waiting for the response of a transaction on the bus, orphan responses will be present on the bus. The master will not understand them after resetting, with the risk of malfunctioning the master device.

To consider these constraints, a conventional solution is to reset the entire system, or a coherent part of the system, to get back, after restarting, to a clean, known, controlled state of the system or of the part of the system. This solution cannot be applied to the systems on a chip having several master devices, in which one of the masters executes a critical function, such as the control of a motor.

Another conventional solution is to wait for the master device to enter a Wait For Interrupt state to guarantee that no transaction is ongoing during the reset. This solution only works when the processor stalls in a software manner, for example, in an infinite loop, and does not enter the Wait For Interrupt state. In this case, the reset never occurs, and a reset of the entire system must be applied.

Another conventional solution is to reset the bus affected by the transaction at the same time as the master. This solution requires a specific bus architecture and a deep correlation between the bus infrastructure and the master device, which can limit the choice of the master devices in the system or constrain the architecture of the interconnection system.

It is, thus, advantageous to secure the resets of the master devices of systems on a chip without being subject to the constraints above. In particular, without resetting all the devices connected on the bus, to be compatible with software blockages, and without imposing the infrastructure of the buses and of the master devices that are connected thereto.

SUMMARY

According to one aspect, in this respect, a method is proposed for resetting a master device configured to initiate transactions on a bus of a system on a chip, having monitoring of a completed or not state of the transactions initiated by the master device, and, in the case of reception of a command to reset the master device, an effective resetting of the master device when the transactions initiated by the master device are in the completed state.

In other words, it is proposed to intercept a reset command and only retransmit it to the master device when all the previous transactions on the bus are completed. This allows to guarantee a compatible state of the transactions on the bus with the resetting of the master device and avoid the presence of an incomplete transaction on the bus and reception of an orphan response by the master device. According to this aspect, the method is further compatible with any type of associated communication protocol bus.

According to one embodiment, the monitoring includes detection of signals transiting over input and output ports of an interface between the master device and the bus.

Detection of the presence of signals on the input and the output of the interface can indeed allow monitoring whether the transactions initiated by the master device are completed or not, in an advantageously simple manner compatible with any type of communication protocol.

According to one embodiment, a transaction includes the emission of a request on the output port of the interface and reception of a response on the input port of the interface. The monitoring includes counting the number of requests emitted on the output port and counting the number of responses received on the input port, a number of responses received equal to the number of requests emitted being representative of the completed state of the transactions initiated by the master device.

Thus, as long as the difference between the counted number of emitted requests and the counter number of received responses is not zero, the transactions initiated by the master device on the buses are in the non-completed state.

According to one embodiment, a blocking signal is generated upon reception of the command to reset the master device, in such a way as to block the initiation of a new transaction by the master device.

In the case of reception of the command to reset the master device during the transmission of a request, the blocking signal is advantageously generated after the end of the transmission of this request.

The blocking signal can be generated in this respect immediately after the end of the emission of a request by the master device, if the reset command is received during this emission to block the initiation of a next (new) transaction.

According to one embodiment, the generation of the blocking signal includes activation of an effective reset signal, and the effective resetting of the master device includes a deactivation of the effective reset signal when the transactions initiated by the master device are in the completed state and when the reset command received has ended.

"Activation of a signal" means "placement of the signal at a first logical level,", for example, the high level for a logical '1', and "deactivation" means "placement of the signal at a second logical level,", for example, the low level for a logical '0'.

The reset command, viewed by the master device, is typically communicated by activation of a signal, called effective reset signal here, which imposes a stoppage of the activity and a resetting to zero of the master device, followed by deactivation of the effective reset signal which authorizes a restarting of the activity reset to zero.

A transaction typically includes a response transmitted on the bus. Advantageously, the responses transmitted on the bus when the effective reset signal is activated are not communicated to the master device and are erased from the bus.

"Erased from the bus" means that the responses are received and optionally confirmed in such a way as to close the transaction from the point of view of the device emitting the response.

According to another embodiment, the generation of the blocking signal includes transmission to the master device of a signal of state of the bus forced into the busy state, the effective resetting of the master device having a pulse activation of an effective reset signal.

A signal of state of the bus can conventionally be provided, for example, to communicate a ready state or a busy state to establish a link (handshake). This signal of the state of the bus is advantageously forced into the busy state to block the initiation of a new transaction by reusing the initial function of the state signal.

This has the advantage of perfectly adapting in a system providing this type of signal of state of the bus, for example, like in the protocols for communication on the buses of the "AMBA" Advanced Microcontroller Bus Architecture type.

For example, since a transaction includes a response transmitted on the bus, the responses transmitted on the bus when the signal of state of the bus is forced into the busy state can be communicated to the master device.

The master device can thus receive the data and "erase" it from the bus, that is, close the transaction from the point of view of the peripheral emitting the response.

According to one embodiment, an auxiliary reset command is generated in the case of reception of a command to reset the master device and if the transactions initiated by the master device are in the non-completed state after the expiration of a maximum response time. The auxiliary command thus allows having an alternative in the resetting process in case of a problem leading to transactions that would never be completed.

The auxiliary reset command can, for example, be intended for a secure control device, capable of taking a secure decision on the matter, or optionally for ordering as a last resort a reset of the entire system.

According to another aspect, a system on a chip is proposed having a bus and at least one master device configured to initiate transactions on the bus. A reset management circuit including an input intended to receive a command to reset the master device is configured to monitor a completed or not state of the transactions initiated by the master device, and, in case of reception of a reset command on the input, to effectively reset the master device when the transactions initiated by the master device are in the completed state.

According to one embodiment, the reset management circuit is configured to detect signals transiting on input and output ports of an interface between the master device and the bus to monitor the completed or not state of the transactions.

According to one embodiment, a transaction includes emission of a request on the output port of the interface and reception of a response on the input port of the interface. The reset management circuit is configured to monitor the completed or not state of the transactions by counting the number of requests emitted on the output port and by counting the number of responses received on the input port, a number of responses received equal to the number of requests emitted being representative of the completed state of the transactions initiated by the master device.

According to one embodiment, the reset management circuit is configured to generate a blocking signal at the moment of reception of the command to reset the master device on the input in such a way as to block the initiation of a new transaction by the master device.

In the case of reception of the command to reset the master device during the transmission of a request, the reset management circuit is advantageously configured to generate the blocking signal after the end of the transmission of this request.

Advantageously, the reset management circuit is configured to generate the blocking signal by activating an effective reset signal and to effectively reset the master device by deactivating the effective reset signal when the transactions initiated by the master device are in the completed state and when the reset command received on the input has ended.

Advantageously, a transaction includes a response transmitted on the bus. The reset management circuit is configured to not communicate to the master device and erase from the bus the responses transmitted on the bus when the effective reset signal is activated.

According to one embodiment, the reset management circuit is configured to generate the blocking signal by transmitting to the master device a signal of state of the bus forced into the busy state and to effectively reset the master device by activating in a pulsed manner an effective reset signal.

Advantageously, a transaction includes a response transmitted on the bus. The reset management circuit is configured to communicate to the master device the responses transmitted on the bus when the signal of state of the bus is forced into the busy state.

According to one embodiment, the reset management circuit is configured to generate an auxiliary reset command in case of reception of a command to reset the master device and if the transactions initiated by the master device are in the non-completed state after the expiration of a maximum response time.

BRIEF DESCRIPTION OF THE DRAWINGS

For a more complete understanding of the present disclosure and the advantages thereof, reference is now made to the following descriptions taken in conjunction with the accompanying drawings, in which:

FIG. 1 is a diagram of an embodiment system on a chip;

FIG. 2 is a diagram of an embodiment reset management circuit;

FIG. 3 is a flow diagram of an embodiment method;

FIGS. 4, 5, and 6 are embodiment timing diagrams;

FIG. 7 is a diagram of an embodiment reset management circuit;

FIG. 8 is a flow diagram of an embodiment method; and

FIGS. 9 and 10 are embodiment timing diagrams.

DETAILED DESCRIPTION OF ILLUSTRATIVE EMBODIMENTS

FIG. 1 shows a system on a chip (SYS) having a first master device ((MT_A)) connected on a first bus (BUS_1)

via a first interface (INTF_A), as well as a second master device (MT_B) connected on a second bus (BUS_2) via a second interface (INTF_B).

The master devices (MT_A), (MT_B) are capable of initiating transactions on the buses (BUS_1), (BUS_2). A transaction is initiated by the emission of a request and is closed or completed by receiving a response to the request.

The master devices (MT_A), (MT_B) can, for example, be processing units of the processor type, having a central or special function, or elements with a particular function such as a direct memory access (DMA) device.

The master devices (MT_A), (MT_B) can be capable of alternating between functions of the master type or of the slave type on different interfaces, the respective interfaces (INTF_A), (INTF_B) being the interfaces of the master type (the interfaces of the slave type are not shown).

Peripherals (PRPH_1), (PRPH_N), for example, of functions of the slave type, are connected on the first bus (BUS_1), and peripherals (PRPH_N+1), (PRPH_M), for example, of functions of the slave type, are connected on the second bus (BUS_2).

The first bus (BUS_1) and the second bus (BUS_2) are in this example connected by a bridge (BRDG), allowing to translate communications from one bus to the other. For example, the first bus (BUS_1) can be of the Advanced eXtensible Interface (AXI) type, and the second bus can be of the Advanced High-performance Bus (AHB) type. Of course, other types of buses of a system on a chip are possible, such as Advanced Microcontroller Bus Architecture (AMBA), Advanced Peripheral Bus (APB), Advanced System Bus (ASB), or the like.

Moreover, the two buses (BUS_1), (BUS_2) can use the same technology and form the same single bus, or other buses with technologies not mentioned here could be provided in the system on a chip (SYS).

The system on a chip (SYS) includes a reset and clock controller device (RCC) intended to provide clock signals (not shown) and reset commands (COM_RST) intended in particular for the master devices (MTA), (MT_B), and more generally for the peripherals connected on the buses (BUS_1), (BUS_2) of the system on a chip (SYS).

The pathway for transmission of the reset commands (COM_RST) is not linked to the communications transmitted on the buses (BUS_1), (BUS_2) and, for this reason, is called asynchronous.

A reset management circuit (GST_A), (GST_B) is provided for each, or for at least one, master device (MT_A), (MT_B). The reset management circuits (GST_A), (GST_B) are configured to receive the asynchronous reset command (COM_RST) intended for the respective master device (MT_A), (MT_B).

Each reset management circuit (GST_A), (GST_B) is configured to retransmit to the corresponding master device (MT_A), (MT_B) a reset command (COM_RST_EFF), effectively with respect to the state of the ongoing transactions at the time of the reset command (COM_RST).

Indeed, each reset management circuit (GST_A), (GST_B) includes an input intended to receive the command (COM_RST) to reset the master device (MT_A), (MT_B), and is configured to monitor a completed or not state of the transactions initiated by the master device (MT_A), (MT_B). In case of reception of a reset command (RST) on the input, the reset management circuit (GST_A), (GST_B) is configured to effectively reset the master device (MT_A), (MT_B) when the transactions initiated by the master device are in the completed state. The reset of the master device is carried out via the "effective" reset command (COM_RST_EFF).

In this example, the reset management circuits (GST_A), (GST_B) are interposed at the interfaces (INTF_A), (INTF_B) between the respective master device (MT_A), (MT_B) and the respective bus (BUS_1), (BUS_2), for example, to detect signals transiting on input and output ports of the interfaces (INTF_A), (INTF_B).

FIG. 2 illustrates an embodiment of a reset management circuit (GST) as described above, for example, in relation to FIG. 1. The reset management circuit (GST) is interposed at the interface between the respective master device and the bus (BUS). The reset management circuit (GST) is configured to transmit, without modifying, requests emitted by the master device on an output port (MT_OUT) of the interface and responses received on an input port (MT_IN) of the interface.

In an example of an interface including input-output registers provided to transit the data of the transactions (usually called "register slice"), monitoring the completed or non-completed state of the transactions initiated by the master device can, for example, be carried out on the registers.

The reset management circuit (GST) includes a synchronization element (RST_SYNC) having an input connected to the pathway for transmission of a reset command (COM_RST) emitted by the reset and clock controller device (RCC).

The synchronization element (RST_SYNC) is configured to synchronize an effective reset command (COM_RST_EFF), with the master device obtaining a completed state of the transactions initiated on the bus (BUS).

The reset management circuit (GST) includes a request counter (CNT_REQ) configured to count the number of requests emitted by the master device and a response counter (CNT_ANS) configured to count the number of responses received.

For example, the request counter (CNT_REQ) is capable of detecting signals transiting on the output port (MT_OUT) of the interface to count the requests; and, similarly, the response counter (CNT_ANS) is capable of detecting signals transiting on the input port (MT_IN) of the interface, to count the responses.

For this purpose, the counters can be based on only a part of the signals of the protocol to detect a request or a response and are, for example, created by a combinatory-logic circuit.

The numbers counted are communicated to the synchronization element (RST_SYNC), which is configured to subtract the number of responses counted from the number of requests counted, the result giving the number of ongoing transactions on the bus (BUS).

Advantageously to limit the size of the counters, the same counter can be incremented for each request emitted and decremented for each response received, in such a way as to be directly representative of the number of ongoing transactions on the bus (BUS).

In other words, the counters do not need to carry out a reading of the signals and an analysis of their contents. Still, the simple detection of a presence of a signal, for example, in transit in the input-output registers or by a logical detection on the protocol signals, allows to carry out the counting to monitor the completed or not state of the transactions initiated by the master device.

Thus, a zero number of ongoing transactions on the bus (BUS) is representative of a completed state of the transactions initiated by the master device. In contrast, a non-zero number of ongoing transactions on the bus (BUS) is representative of a non-completed state of the transactions initiated by the master device.

As will appear in more detail below, the synchronization element (RST_SYNC) is configured to generate a blocking signal to block the initiation of a new transaction by the master device at the moment of reception of the reset command (RST) on the input.

The blocking signal can, for example, be embodied by activation of an effective reset signal (RST_EFF) (FIGS. 4 to 6) by which the effective reset command (COM_RST_EFF) is carried.

A distinction between the effective reset command and the effective reset signal should be noted. In embodiments, the effective reset command communicates an instruction logic and is carried by the effective reset signal. The effective reset signal can have two logical levels, a high level or a low level. The logical values and the translation of these values in terms of instruction are chosen arbitrarily. The effective reset signal is "activated" at the chosen level to produce a command effect. The effective reset signal is "deactivated" at the reset level, chosen not to produce its own command effect.

It is conventionally defined that the effective reset signal is activated at the high level and deactivated at the low level. The effective reset command produces a "resetting to zero" of the variable elements of the master device as well as blocking of its activity on the bus when the effective reset signal is activated. A restart in the initial state and normal operation of the master device is permitted when the effective reset signal is deactivated.

Thus, in this example, the synchronization element (RST_SYNC) activates the effective reset signal (RST_EFF) (FIGS. 4 to 6) to block the initiation of a new transaction by the master device and deactivates the effective reset signal (RST_EFF) when the transactions initiated on the bus (BUS) are in the completed state and the reset command (RST) is completed.

The synchronization element (RST_SYNC) can be configured to provide a reset confirmation signal (ACKRST) (usually "acknowledgment") after the effective reset. In this specific embodiment, the reset management circuit (GST) further includes a reception element (ANS_DRP) configured to erase from the bus possible responses transmitted when the master device is blocked in this way. The responses received when the master device is blocked are not communicated to the master device.

"Erased from the bus" means that the responses are received, and optionally that a confirmation signal (for example of the "acknowledgment" type) is emitted to the peripheral emitting the response in such a way as to close the transaction on the bus (BUS) correctly according to the protocol used.

Moreover, the reset management circuit (GST) can include its own reset input, intended to receive a reset signal (RST_GST) dedicated to the reset management circuit (GST). In particular, this is provided for a command to reset the entire system, including the reset management circuit (GST), to start over from a clean state.

FIG. 3 is a block diagram illustrating an embodiment execution of the resetting of a master device, implemented by a reset management circuit (GST) as described above to FIG. 2. FIGS. 4, 5, and 6 are timing diagrams representing the signals involved during the execution of the reset according to this embodiment and for various other situations.

At step 310 of the method for resetting the master device 300, a command to reset the master device is received. The method includes on the one hand a step 320 of verifying whether a transaction is being initiated by the master device, that is to say if the generation of a request in underway. For example, the request counter (CNT_REQ) can be provided for this purpose and transmit the information to the synchronization element (RST_SYNC).

If a request is being generated during the reception of the reset command 310, then step 320 waits (Y) until the request has finished being generated. If there is no generation of a request underway or when the request has finished being generated (N), then the effective reset signal is activated at step 330 in such a way as to block the initiation of a new transaction by the master device.

Then, at step 340, the method waits (Y) for no more responses expected to the requests previously initiated by the master device. In other words, step 340 corresponds to monitoring of a completed or not state of the transactions initiated by the master device.

After step 340, when all the expected responses are received, and thus when the transactions initiated are in the completed state (N), the method includes a step 350 of verifying that the reset command has ended, and optionally of waiting (N) for the reset command to end.

As mentioned above, for the effective reset command, the reset command received at step 310 includes the activation of a signal, and ends when this signal is deactivated.

Finally, at step 360, the effective reset signal is deactivated after the transactions initiated are in the completed state 340 (Y), and after the reset command signal is deactivated 350 (N). Moreover, after step 360, the method can include transmitting the reset confirmation signal (ACK-RST) (not shown).

FIG. 4 shows the signals generated during method 300 in the case in which no transaction (TRSCT) was initiated before or during the reception of the reset command (COM_RST). Thus, the number of ongoing transactions (TRSCT_NB) is zero, and the effective reset signal (RST_EFF) is activated and deactivated at the same time as the reset signal (RST). In other words, the effective reset (COM_RST_EFF) is ordered to the master device at the same time as the reset command (COM_RST) is received.

FIG. 5 represents the signals generated during method 300 in the case in which a transaction (TRSCT) is initiated by the master device during the reception of the reset command (COM_RST). Thus, the effective reset signal (RST_EFF) is activated after the end of the generation of the request (REQ), and the number of ongoing transactions (TRSCT_NB) is equal to 1, which is representative of a non-completed state of the transactions initiated by the device. The reset signal is maintained and activated until the number of ongoing transactions (TRSCT_NB) becomes zero. After the reception of the response (ANS) to the request (REQ), the number of ongoing transactions (TRSCT_NB) is zero, the transactions initiated by the master device are thus in the completed state, and the effective reset signal (RST_EFF) is deactivated. After the effective reset command (COM_RST_EFF), the confirmation (ACK-RST) can be transmitted.

FIG. 6 shows the signals generated during method 300 in the case in which transactions (TRSCT) are initiated by the master device before and during the reception of the reset command (COM_RST). The number of ongoing transactions (TRSCT_NB) is thus at 1 at the moment of reception of the reset command (COM_RST) and brought to 2 after the generation of a second request (REQ2). The number of ongoing transactions (TRSCT_NB) goes back to 1 after the reception of the response (ANS1) to the first request (REQ1), and becomes zero after the reception of the response (ANS2) to the second request (REQ2). The responses (ANS1), (ANS2) are not communicated to the master device and are erased from the bus. When the transactions initiated by the master device are in the completed state (i.e., the number of ongoing transactions (TRSCT_NB) is zero), the effective reset signal (RST_EFF) is deactivated, and the confirmation (ACKRST) can be transmitted.

FIG. 7 illustrates an embodiment of the reset management circuit (GST) as an alternative to the example described above to FIG. 2. Nevertheless, the elements common to these embodiments carry the same references and will not be described in detail again below.

This embodiment differs from the embodiment in relation to FIG. 2 in that the circuit (GST) does not include a reception element (ANS_DRP) but includes a blocking circuit (BUS_GAT) configured to transmit a signal (BUS_ST) of state of the bus (BUS) to the master device.

The state signal (BUS_ST) is intended to carry out a procedure for establishing a link (handshake) between the master device and the bus (BUS) to determine whether the bus (BUS) can accept a new request. The state signal (BUS_ST) can typically have a ready state or a busy state. This type of state signal (BUS_ST) is, for example, used in the communication on an Advanced eXtensible Interface (AXI) bus.

In brief, in the procedure for establishing a link in the AXI protocol, a validity signal "valid" is sent by the master device to inform the receiver peripheral that the information on the bus (BUS) can be read. The state signal (BUS_ST) is provided by a stream management system, integrated into the bus (BUS) to inform that the bus is ready, and thus operational to accept a new transaction or that it is busy and therefore not operational to accept a new transaction. If a busy signal is transmitted to the master device, then the latter cannot send a new request.

The reset management circuit (GST) can be configured to retransmit the state signal (BUS_ST) received on the bus (BUS) during normal operation.

And, in case of reception of a reset command (COM_RST), the synchronization element is advantageously configured to force the state signal (BUS_ST) into the busy state to block the initiation of a new transaction by the master device.

Thus, in this example, the generation of the blocking signal allowing to block the initiation of a new transaction by the master device is executed by forcing the state signal (BUS_ST) into the busy state.

In this example, the responses transmitted on the bus when the signal of state of the bus (BUS_ST) is forced into the busy state are communicated normally to the master device.

FIG. 8 is a block diagram illustrating the execution of the resetting of a master device, implemented by a reset management circuit (GST) as described above in relation to FIG. 7. FIGS. 9 and 10 are timing diagrams showing the signals involved during the execution of the reset according to this embodiment and for various situations.

At step 810 of the method for resetting the master device 800, a command to reset the master device is received. The method includes a step 820 of verifying whether a transaction is being initiated by the master device, similarly to verification step 320 described above in relation to FIG. 3.

If there is no generation of a request underway or when the request has finished being generated (N), then the signal of state of the bus is forced into the busy state (BSY), during step 830, in such a way as to block the initiation of a new transaction by the master device.

A monitoring step 840 waits (Y) for a completed state of the transactions initiated by the master device. After step 840, when all the expected responses are received, and thus when the transactions initiated are in the completed state (N), the effective reset command is generated during step 850. The effective reset is ordered by a pulse of the effective reset signal, that is to say an activation of the signal for a duration sufficiently long to reset the master device, and deactivation of the signal.

Of course, a verification step (not shown) similar to the verification step 350 described above in relation to FIG. 3 can be provided between the monitoring step 840 and the step of generating the effective reset command 850. And, after step 850, method 800 can also include the transmission of the reset confirmation signal (ACKRST) (not shown).

FIG. 9 shows the signals generated during method 800 in the case in which a transaction (TRSCT) is initiated by the master device during the reception of the reset command (COM_RST). Thus, the signal of state of the bus (BUS_ST) is initially in the ready state (RDY), and is forced into the busy state (BSY) after the end of the generation of the request (REQ). Of course, the number of ongoing transactions (TRSCT_NB) goes to 1, representing a non-completed state of the transactions initiated by the master device.

The signal of state of the bus (BUS_ST) is busy (BSY) until the number of ongoing transactions (TRSCT_NB) becomes zero. After the reception of the response (ANS) to the request (REQ), the number of ongoing transactions (TRSCT_NB) is zero, which represents a completed state of the transactions initiated by the master device.

Consequently, the effective reset command (COM_RST_EFF) is generated in the form of a pulse activation of the effective reset signal (RST_EFF). Moreover, the signal of state of the bus (BUS_ST) is no longer forced and goes back to its function of establishing a link and goes back, for example, to the ready state (RDY). After the effective reset command (COM_RST_EFF), the confirmation (ACKRST) can be transmitted.

FIG. 10 shows the signals generated during method 800 in the case in which transactions (TRSCT) are initiated by the master device before and during the reception of the reset command (COM_RST). The number of ongoing transaction (TRSCT_NB) is thus at 1 at the moment of reception of the reset command (COM_RST). Before receiving the reset command (COM_RST), the signal of state of the bus (BUS_ST) is not forced into the busy state (BSY) and remains ready RDY.

After the generation of a second request (REQ2), the number of ongoing transactions (TRSCT_NB) is brought to 2, and, being representative of a non-completed state of the transactions on the bus, the signal of state of the bus (BUS_ST) is forced into the busy state (BSY). The number of ongoing transactions (TRSCT_NB) goes back to 1 after reception of the response (ANS2) to the second request (REQ2) and becomes zero after the reception of the response (ANS1) to the first request (REQ1).

The responses (ANS2), (ANS1) are communicated to the master device normally. When the transactions initiated by the master device are in the completed state (i.e., the number of ongoing transactions (TRSCT_NB) is zero), the effective reset command (COM_RST_EFF) is generated in the form of a pulse in the effective reset signal (RST_EFF), the signal of state of the bus (BUS_ST) goes back to the ready state (RDY), and the confirmation (ACKRST) can be transmitted.

The responses (ANS2), (ANS1) can be received in an order different from the order of emission of the requests (REQ1), (REQ2).

It is noted that in an advantageously polyvalent and straightforward manner, the monitoring does not include identifying the responses received. Therefore, it does not consider the order of reception of the responses received to evaluate the completed or not state of the transactions initiated by the master.

Moreover, all the implementations and embodiments described above in relation to FIGS. 1 to 10 can provide a generated auxiliary reset command if the transactions initiated by the master device are in the non-completed state after expiration of a maximum response time.

For example, a stopwatch can be provided in the reset management circuits (GST), the action of which could be located, in loop (Y) of the steps of waiting for reception of a response 340, 840 (in relation to FIGS. 3 and 8) of the monitoring of a completed or not state of the transactions initiated by the master device. And, if beyond an arbitrarily chosen maximum duration the transactions initiated have remained in the non-completed state, then the auxiliary reset command can be transmitted to an optional secure control device, or, for example, in order to reset all the peripherals of the system on a chip, as a last-resort solution.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method, comprising:
   having a system on a chip device comprising a master circuit and a bus;
   monitoring a state of outstanding transactions initiated by the master circuit on the bus, wherein initiating a transaction corresponds to emitting a request by the master circuit;
   determining that the state of the outstanding transactions initiated by the master circuit is in a completed state and, in response, resetting the master circuit after receiving a reset command, wherein a transaction being in a completed state corresponds to the master circuit receiving a response to the request; and
   determining that the state of outstanding transactions initiated by the master circuit is in a non-completed state after an expiration of maximum response time and, in response, resetting the master circuit after receiving the reset command, wherein a transaction being in a non-completed state corresponds to the master circuit failing to receive a response to the request.

2. The method of claim 1, wherein the system on the chip device further comprises an interface having an input port and an output port, the monitoring the state of the outstanding transactions comprising detecting a signal over the input port and the output port.

3. The method of claim 2, wherein a respective transaction comprises emission of a request on the output port and reception of a response on the input port, the monitoring the state of the outstanding transactions further comprises counting a number of requests emitted at the output port and counting a number of responses received at the input port, and wherein the number of responses received being equal to the number of requests emitted corresponding to a state of the respective transaction being in the completed state.

4. The method of claim 1, further comprising:
   generating a blocking signal in response to receiving the reset command; and
   blocking an initiation, by the master circuit, of a new transaction in response to the generating the blocking signal.

5. The method of claim 4, wherein the generating the blocking signal comprises activating a reset signal, and the resetting the master circuit comprises deactivating the reset signal.

6. The method of claim 5, wherein a respective transaction comprises a response signal, the response signal being transmitted on the bus, the method further comprises blocking reception of the response signal from the bus to the master circuit in response to the generating the blocking signal, the blocking reception of the response signal further comprising erasing the response signal on the bus.

7. The method of claim 4, wherein generating the blocking signal comprises transmitting a signal corresponding to the state of the bus to the master circuit, the state of the bus being in a forced busy state, and the resetting the master circuit comprising activating a pulsed signal corresponding to the reset command.

8. The method of claim 7, wherein a respective transaction comprises a response signal, the response signal being transmitted on the bus, the method further comprising communicating to the master circuit the response signal in response to the state of the bus being in the forced busy state.

9. The method of claim 1, wherein the master circuit is a processor a direct memory access (DMA) circuit.

10. A system on a chip device, the system on the chip device comprising:
    a bus;
    a master circuit coupled to the bus, the master circuit configured to initiate a respective transaction on the bus; and
    a reset management circuit coupled to the master circuit and the bus, the reset management circuit configured to:
      monitor a state of outstanding transactions initiated by the master circuit on the bus, wherein initiating a transaction corresponds to emitting a request by the master circuit,
      determine that the state of the outstanding transactions initiated by the master circuit is in a completed state and, in response, reset the master circuit after receiving a reset command at an input of the reset management circuit, wherein a transaction being in a completed state corresponds to the master circuit receiving a response to the request, and determine that the state of outstanding transactions initiated by the master circuit is in a non-completed state after an expiration of maximum response time and, in response, reset the master circuit after receiving the reset command at the input of the reset management circuit, wherein a transaction being in a non-completed state corresponds to the master circuit failing to receive a response to the request.

11. The system on the chip device of claim 10, further comprising an interface having an input port and an output port, the monitoring the state of the outstanding transactions by the reset management circuit comprising detecting a signal over the input port and the output port.

12. The system on the chip device of claim 11, wherein a respective transaction comprises emission of a request on the output port and reception of a response on the input port, the monitoring the state of the outstanding transactions further comprises counting a number of requests emitted at the output port and counting a number of responses received at the input port, and wherein the number of responses received being equal to the number of requests emitted corresponding to a state of the respective transaction being in the completed state.

13. The system on the chip device of claim 11, wherein the master circuit is a processor or a direct memory access (DMA) circuit.

14. The system on the chip device of claim 10, wherein the reset management circuit is further configured to:
generate a blocking signal in response to receiving the reset command; and
block an initiation, by the master circuit, of a new transaction in response to the generating the blocking signal.

15. The system on the chip device of claim 14, wherein the generating the blocking signal comprises activating a reset signal, and the resetting the master circuit comprises deactivating the reset signal.

16. The system on the chip device of claim 15, wherein a respective transaction comprises a response signal, the response signal being transmitted on the bus, and wherein the reset management circuit is further configured to block reception of the response signal from the bus to the master circuit in response to the generating the blocking signal, the blocking reception of the response signal further comprising erasing the response signal on the bus.

17. The system on the chip device of claim 14, wherein generating the blocking signal comprises transmitting a signal corresponding to the state of the bus to the master circuit, the state of the bus being in a forced busy state, and the resetting the master circuit comprising activating a pulsed signal corresponding to the reset command.

18. The system on the chip device of claim 17, wherein a respective transaction comprises a response signal, the response signal being transmitted on the bus, and wherein the reset management circuit is further configured to communicate to the master circuit the response signal in response to the state of the bus being in the forced busy state.

19. A device comprising a system on a chip, the system on the chip comprising:
a bus;
a master circuit coupled to the bus, the master circuit configured to initiate a transaction on the bus; and
a reset management circuit coupled to the master circuit and the bus, the reset management circuit configured to:
monitor a state of outstanding transactions initiated by the master circuit on the bus, wherein initiating a transaction corresponds to emitting a request by the master circuit,
determine that the state of the outstanding transactions initiated by the master circuit is in a completed state and, in response, reset the master circuit after receiving a reset command at an input of the reset management circuit, wherein a transaction being in a completed state corresponds to the master circuit receiving a response to the request, and
determine that the state of outstanding transactions initiated by the master circuit is in a non-completed state after an expiration of maximum response time and, in response, reset the master circuit after receiving the reset command at the input of the reset management circuit, wherein a transaction being in a non-completed state corresponds to the master circuit failing to receive a response to the request.

20. The device of claim 19, the system on the chip further comprising an interface having an input port and an output port, wherein a respective transaction comprises emission of a request on the output port and reception of a response on the input port, the monitoring the state of the transaction further comprises counting a number of requests emitted at the output port and counting a number of responses received at the input port, and wherein the number of responses received being equal to the number of requests emitted corresponding to a state of the respective transaction being in the completed state.

21. The device of claim 19, wherein the master circuit is a processor or a direct memory access (DMA) circuit.

22. The device of claim 19, wherein the reset management circuit is further configured to:
generate a blocking signal in response to receiving the reset command; and
block an initiation, by the master circuit, of a new transaction in response to the generating the blocking signal.

* * * * *